June 13, 1950 — G. M. MYRMIRIDES — 2,511,412
MOTOR GENERATOR
Filed Dec. 30, 1946
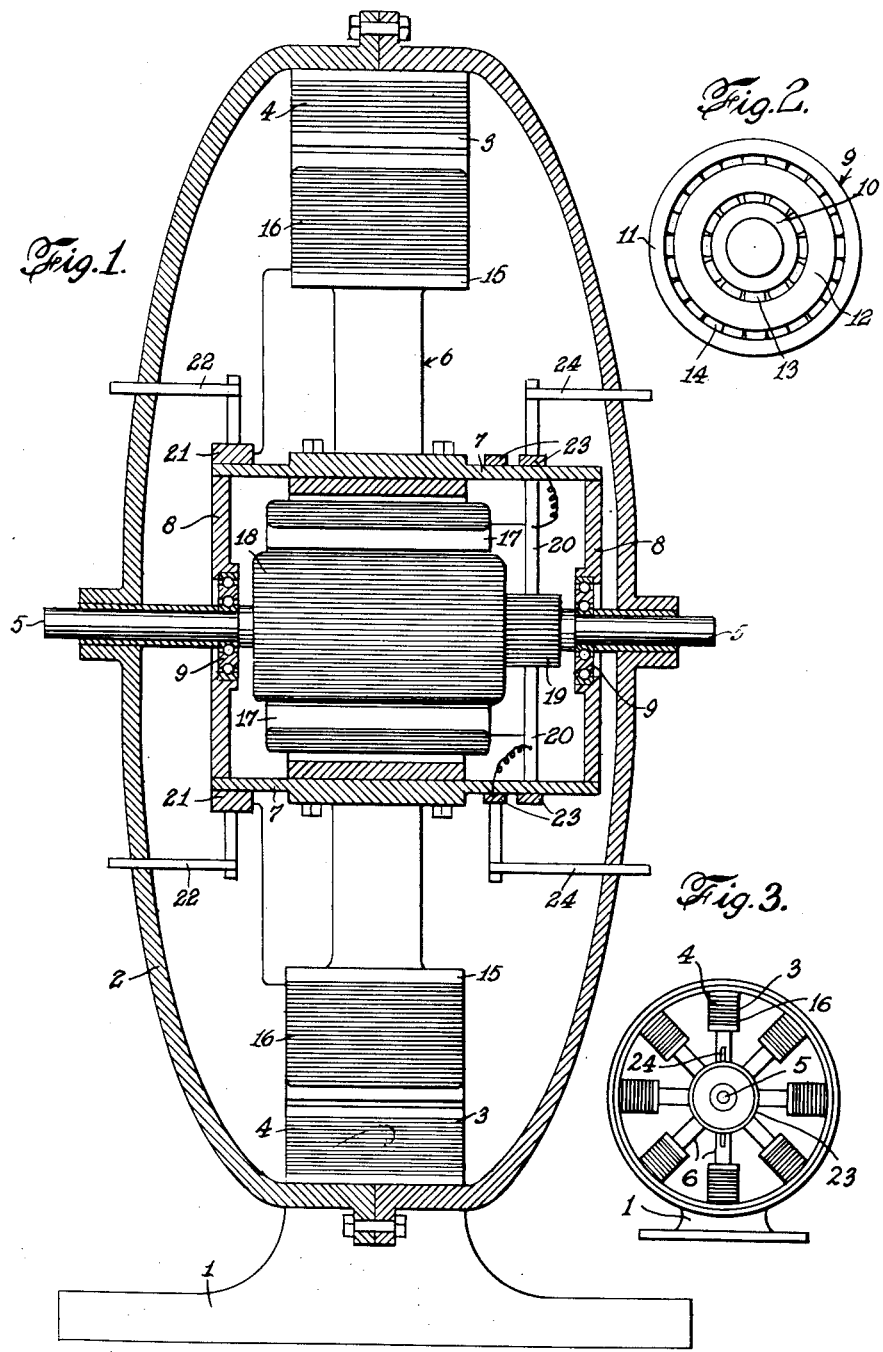
INVENTOR.
GEORGE M. MYRMIRIDES
By Peter M. Boesen
atty.

Patented June 13, 1950

2,511,412

UNITED STATES PATENT OFFICE 2,511,412

MOTOR GENERATOR

George M. Myrmirides, Brooklyn, N. Y.

Application December 30, 1946, Serial No. 719,149

1 Claim. (Cl. 172—36)

This application is an improvement on my application, Serial Number 634,561, filed December 12, 1945, now abandoned, and relating to motor-generator sets.

More particularly this application relates to a motor-generator having only two bearings and free from any shaft subjected to torque.

One object is to provide a motor-generator as compact as possible.

Another object is to reduce frictional or mechanical losses in the operation of such a machine to a minimum by means of double-decked bearings.

Still another object is to eliminate all forms of shaft couplings.

My present motor-generator comprises stationary inner and outer magnetic members and a rotor intermediate said members and surrounding the inner member.

It will be obvious to one skilled in the art that motor-generators such as are disclosed herein may be constructed to produce an output at higher voltage and lower amperage than the input, depending on the characteristics of the several windings and conversely an output at lower voltage with higher amperage. Furthermore, it will be obvious that slip rings may be substituted for commutators to effect changes in the type of current.

In the drawing Figure 1 is a vertical diametric sectional view of the motor-generator and Figure 2 is a plan showing details of one of the bearings.

Figure 3 is an end elevation showing the radial displacement of the various windings.

The motor-generator comprises a base 1 and a stator housing 2 integral therewith and having a plurality of pole pieces 3 fixed in and on the housing, each piece having a coil 4. A fixed shaft 5 passes axially through the housing and upon this shaft a rotor 6 is bearingly mounted within the housing. Said rotor comprises a hollow cylindrical casing 7, similar to the housing of a conventional motor or generator, having end pieces 8 axially alined with the shaft.

In order to reduce frictional losses I provide double-decked ball-bearings 9 between the respective end pieces of the casing and the shaft, each bearing being composed of an inner ring or race 10 fast on the shaft, an outer ring 11 fast on the casing and an intermediate ring 12 between said outer and inner ring. A cage of balls 13 is disposed between the inner and intermediate rings and a cage 14 of a suitable number of balls between the intermediate and outer rings.

A plurality of rotor pole means 15 project radially from the casing and are provided with rotor windings 16. Inner pole-magnets 17 fast on the interior of the casing project inwardly to cooperate with a stationary armature 18 having windings thereon and mounted on the shaft and near the pole magnets 17. A stationary commutator 19 having the segments thereof connected to the windings of the armature is provided on the shaft so that brushes 20 within the casing and secured thereto and engaging said commutator, may collect current from or distribute current to the armature windings as the case may be. Commutator means 21 on the exterior of the casing 7 connected to said rotor windings and fixed brush means 22 engaging the commutator means serve a similar purpose for current to or from the rotor windings 16. Rotary conducting means 23, connected to said brushes 20 and exposed exterior of the casing, conduct current to or from the brushes through the casing, and a second set of fixed brush means 24 engages said rotary conducting means.

In operation, assume input direct current to the brush means 22 and that the stator poles 3 are of constant polarity. The latter condition is possible by having the stator coils 4 connected in series or parallel with the source of input current. In either case the rotor functions as does the armature of any D. C. motor. Rotation of the rotor with its inner pole magnets 17 induces a current in the stationary windings of armature 18 which the rotating brushes 20 take off as direct current. A portion of this current may be used for the windings of magnets 17. Each segment of the means 23 remains either positive or negative so that the current taken off the brush means 24 will be alternating current. Obviously the rotary conductive means 23 may be a pair of slip rings each connected to one of the brushes 20 so that the output may be direct current. Similarly alternating current may be used for the input if slip rings are used to replace the commutator 21. Likewise it will be obvious that input may be applied at the brush means 24 and the output taken from means 22.

Having thus described my invention what I claim as new and desire to secure by Letters Patent of the United States, is:

A motor-generator comprising a base; a stator housing integral with said base and having a plurality of pole pieces fixed in and on the housing; a fixed shaft passing axially through the housing, a rotor bearingly mounted on said shaft and within the housing, said rotor comprising a hollow cylindrical casing provided with end pieces and axially alined with the shaft; bearings between the respective end portions of the casing and the shaft; rotor pole means projecting radially from the casing and provided with rotor windings; inner pole-magnets fast on the interior of the casing and having inner windings thereon; a stationary armature having windings thereon and mounted on the shaft and near the pole magnets, a stationary commutator having the segments thereof connected to the windings of the armature; rotary brushes within the casing and secured thereto and engaging said commutator; commutator means on the exterior of the casing connected to said rotor windings; fixed brush means engaging the commutator means; rotary conducting means fast on the casing and connected to said rotary brushes and connected to said inner windings and exposed exterior of the casing to conduct current from the rotary brushes through the casing; and a second set of stationary brush means engaging said rotary conducting means.

GEORGE M. MYRMIRIDES.

REFERENCES CITED

The following references are of record in the file of this patent:

UNITED STATES PATENTS

| Number | Name | Date |
|---|---|---|
| 912,144 | Mavor | Feb. 9, 1909 |
| 1,620,747 | Allison | Mar. 15, 1927 |
| 1,630,201 | Metcalfe | May 24, 1927 |
| 1,998,142 | Meyertons | Apr. 16, 1935 |
| 2,064,583 | Wolkoff | Dec. 15, 1936 |
| 2,232,159 | Blood | Feb. 18, 1941 |

FOREIGN PATENTS

| Number | Country | Date |
|---|---|---|
| 137,622 | Austria | May 25, 1934 |